United States Patent
Koga et al.

[11] Patent Number: 6,107,223
[45] Date of Patent: Aug. 22, 2000

[54] METHOD FOR PREPARING HIGH STRENGTH AND HIGH THERMAL SHOCK-RESISTANT CHINA FOR CERAMIC WHITEWARE

[75] Inventors: Naoki Koga; Masaki Taneo; Toshiya Nishikawa; Akio Matsumoto, all of Kitakyushu, Japan

[73] Assignee: Toto Ltd, Kitakyushu, Japan

[21] Appl. No.: 08/809,451

[22] Filed: Mar. 28, 1997

Related U.S. Application Data

[63] Continuation of application No. PCT/JP95/01942, Sep. 26, 1995.

[30] Foreign Application Priority Data

Sep. 28, 1994 [JP] Japan ................................. 6-232970

[51] Int. Cl.$^7$ ................................................ C04B 33/24
[52] U.S. Cl. ......................... 501/32; 264/669; 501/118; 501/119; 501/143; 501/144; 501/153
[58] Field of Search ........................... 264/669; 501/119, 501/118, 143, 144, 153, 32

[56] References Cited

U.S. PATENT DOCUMENTS

| | | | |
|---|---|---|---|
| 4,717,695 | 1/1988 | Oda et al. | 501/143 |
| 4,957,554 | 9/1990 | Mathers | 264/648 |
| 5,372,976 | 12/1994 | Matsumoto | 501/32 |

FOREIGN PATENT DOCUMENTS

| | | |
|---|---|---|
| 2-40015 | 9/1990 | Japan . |
| 6-56516 | 3/1994 | Japan . |

OTHER PUBLICATIONS

Chemical Dictionary vol. 5, pp. 553–554 Apr. 1961 (cited in IPER).

*Primary Examiner*—James Derrington
*Attorney, Agent, or Firm*—Cushman Darby & Cushman IP Group of Pillsbury Madison & Sutro LLP

[57] ABSTRACT

A method for preparing high strength and high thermal shock-resistant china for ceramic whiteware which comprises the steps of molding a china-forming raw material which mainly comprises a natural ore material capable of forming corundum through firing or a material obtained by calcining the natural ore material to form corundum, a natural ore material capable of forming mullite through firing or a material obtained by calcining the natural ore material to form mullite, a clayey material and a flux such as feldspar, nepheline or dolomite; and then firing the molded china-forming raw material. The method permits the production of cheaper china for ceramic whiteware having high strength and excellent thermal shock resistance as compared with those prepared by the conventional techniques.

9 Claims, 2 Drawing Sheets

METHOD FOR PREPARING HIGH STRENGTH AND HIGH THERMAL SHOCK-RESISTANT CHINA FOR CERAMIC WHITEWARE

This is a Continuation of International Appln. No. PCT JP95/01942 filed Sep. 26, 1995 which designated the U.S.

TECHNICAL FIELD OF THE INVENTION

The present invention relates to a method for preparing china for ceramic whiteware exhibiting high mechanical strength and high thermal shock resistance, at a low production cost.

PRIOR ART

There has been known that china for ceramic whiteware exhibiting high strength can be obtained by replacing the quartz component present in china for ceramic whiteware comprising a three component system of quartz, feldspar and clay with corundum.

The quartz in the crystalline phase present in the china for ceramic whiteware can be replaced with corundum through the use as a raw material of alumina which comprises corundum crystal instead of quartz or pottery stone used as a quartz source material and including quartz, feldspar and clay. The amount of alumina to be added in general ranges from 10 to 50% by weight based on the total weight of the china-forming raw material.

The quartz/feldspar/clay three component china for ceramic whiteware comprises quartz and mullite crystals dispersed in a glass matrix mainly comprising $SiO_2$.

On the other hand, as a conventional technique for improving the strength of the china, the use as a raw material of alumina which comprises corundum crystal instead of quartz or pottery stone used as a quartz source material and including quartz, feldspar and clay permits, as has been discussed above, the production of china for ceramic whiteware which comprises corundum, quartz and mullite particles as a crystalline phase and which exhibits improved strength through the addition of alumina particles. An alumina source used herein is alumina which comprises corundum crystal and which is industrially produced generally by the Bayer's process, because of its quality and stable availability. In addition, there has also been used alumina produced by the fusing process.

These alumina sources used in the conventional techniques are quite expensive as compared with the raw materials commonly used in the china for ceramic whiteware and hence the resulting china is likewise expensive. This largely limits the applications thereof and such china has presently been used only in certain high grade tablewares and some industrial ceramic whitewares.

Moreover, the high strength china for ceramic whiteware produced by the foregoing conventional techniques suffers from a problem of low thermal shock resistance.

The quartz/feldspar/clay three component china for ceramic whiteware exhibits quite excellent thermal shock resistance. For this reason, large-sized ceramic whiteware products such as sanitary-wares can be produced from the china without causing any crack even by the thermal shock encountered during the cooling process after firing. In addition, the china can likewise be used for the production of sanitary-wares such as wash-bowls which require high thermal shock resistance.

The china exhibits this excellent thermal shock resistance due to the effect of microcracks present in the china and it is assumed that the microcracks, quartz particles and the thermal shock resistance have the following relationship.

As has already been discussed above, the quartz/feldspar/clay three component china for ceramic whiteware has a texture comprising quartz and mullite particles dispersed in a glass matrix. The thermal expansion coefficient of quartz is substantially greater than that of glass matrix and accordingly, microcracks are formed at the boundary between the quartz particles and the glass matrix due to the stress originated from the difference of volume change of these components observed during cooling process after firing. This phenomenon can be observed by SEM (scanning electron microscope). Moreover, the amount of the microcracks thus formed is proportional to the amount of quartz particles. The presence of such microcracks permits absorption of the stress due to thermal shock and hence prevents any propagation of breakage or cracks. Therefore, the higher the amount of microcracks, the higher the thermal shock resistance of the china.

On the other hand, the high strength china for ceramic whiteware of the conventional techniques in which alumina is substituted for quartz as a raw material for the china is inferior in the thermal shock resistance to the quartz/feldspar/clay three component china for ceramic whiteware. In such a high strength china for ceramic whiteware, almost all of the quartz particles in the china is replaced with alumina particles. The thermal expansion coefficient of alumina particles is approximately equal to that of glass matrix and therefore, microcracks are not formed at the boundary therebetween. Accordingly, the amount of microcracks in the china is reduced and this leads to a decrease of the thermal shock resistance thereof.

Such a low thermal shock resistance of the high strength china for ceramic whiteware produced by the conventional techniques would be an obstacle in the application thereof to large-sized ceramic whiteware products and other ceramic whitewares which require high thermal shock resistance.

As has been discussed above, the high strength china for ceramic whiteware produced by the conventional techniques suffers from the following two major problems. More specifically, it requires an increased cost as compared with the quartz/feldspar/clay three component china for ceramic whiteware and it is inferior in the thermal shock resistance to the latter.

DISCLOSURE OF THE INVENTION

Accordingly, the object of the present invention is generally to solve the foregoing two problems and more specifically to provide a method for preparing china for ceramic whiteware having excellent strength and thermal shock resistance at a low production cost.

According to an aspect of the present invention, there is provided a method for preparing china for ceramic whiteware which comprises the steps of: molding a china-forming raw material mainly comprising a natural ore material which forms corundum through firing or a material obtained by calcining the natural ore material to form corundum, a natural ore material which forms mullite through firing or a material obtained by calcining the natural ore material to form mullite, a clayey material and flux, and then firing the molded china-forming raw material.

According to another aspect of the present invention, there is provided a method for preparing china for ceramic whiteware which comprises the steps of: molding a china-forming raw material mainly comprising a natural ore material which forms corundum and mullite through firing or a material obtained by calcining the natural ore material to form corundum and mullite; a clayey material; and flux, and then firing the molded china-forming raw material.

The flux is preferably selected from the group consisting of feldspar, nepheline and dolomite.

BRIEF DESCRIPTION OF THE DRAWINGS

FIG. 1 shows an elevational view and a plan view of a sanitary-ware (wash bowl) prepared according to the method of the present invention.

FIG. 2 shows an elevational view and a plan view of a sanitary-ware (water closet) prepared according to the method of the present invention.

PREFERRED EMBODIMENTS FOR CARRYING OUT THE INVENTION

The strength of the china for ceramic whiteware prepared by the conventional technique in which alumina, as a raw material therefor, is substituted for quartz is improved by increasing the amount of alumina to be substituted for quartz or the amount of alumina to be added. However, if the amount of alumina to be substituted for quartz increases, the amount of microcracks formed by quartz particles decreases and accordingly, the thermal shock resistance of the resulting china is impaired. Under such circumstances, it has conventionally been devised that an appropriate amount of quartz particles is retained so that the thermal shock resistance is not impaired so much. However, if quartz particles and hence microcracks are retained, the resulting china exhibits low strength. Accordingly, it is impossible to prepare china having high strength and excellent thermal shock resistance simply by controlling the amount of quartz particles and that of alumina to be added like the conventional techniques. As has been discussed above, the preparation of the foregoing china requires such a device that the thermal shock resistance of the china is improved without impairing the strength thereof.

The inventors of this invention have conducted various studies to develop a method for improving the thermal shock resistance of china without impairing the strength thereof while taking note of the difference in the thermal expansion coefficient between crystal particles in the china.

The thermal shock resistance of china can in general be expressed by the following relation:

$\Delta T \; \sigma(1-\nu)\kappa/\alpha E$ wherein $\Delta T$ represents thermal shock resistance, $\sigma$ represents the strength, $\nu$ represents the Poisson's ratio, $\kappa$ represents the thermal conductivity, $\alpha$ represents thermal expansion coefficient and E represents the Young's modulus. This relation indicates that the thermal shock resistance can be improved if only the thermal expansion coefficient is reduced while remaining other physical properties unchanged. The inventors have investigated crystal particles having a thermal expansion coefficient smaller than those of alumina and quartz particles in the light of the foregoing finding and as a result, it has been found that the thermal shock resistance of the china can be improved by the addition of mullite particles to the china. The thermal expansion coefficient of mullite is $5.5 \times 10^{-6}$° C. which is smaller than those of quartz and alumina (corundum) ($25 \times 10^{-6}$° C. and $8 \times 10^{-6}$° C., respectively).

Mullite exists also in the quartz/feldspar/clay three component china for ceramic whiteware and in the high strength china for ceramic whiteware whose quartz component is replaced with alumina, in an amount on the order of several to ten-odd percent. In this case, however, mullite does not exist in the raw material per se for the china, but is formed through crystallization from $Al_2O_3$ and $SiO_2$ components in the glass phase of the china during firing the same. The mullite particles thus crystallized has a particle size of about 1 $\mu$m and are usually in the form of needle crystals. The amount of mullite ultimately formed in the china is determined by the composition of the raw material for the china and the conditions for firing the china.

The thermal shock resistance of china can be improved by increasing the amount of mullite which forms crystal particles. Therefore, it is possible to obtain high strength and high thermal shock resistant china for ceramic whiteware by increasing the amount of mullite in high strength china for ceramic whiteware wherein alumina is used instead of quartz.

There would be two methods for increasing the amount of mullite. One method is simple and comprises using mullite as a raw material for the china. This is the simplest method for preparing a desired china. However, if mullite is used as a raw material for the china, an artificially prepared mullite must be used since mullite is not a naturally occuring substance. Therefore, it is more expensive than commonly used raw materials for ceramics and the use thereof results in an increase in the production cost.

The other method comprises controlling the composition of the raw material for the china to the range in which mullite is easily crystallized. This method has been applied for the preparation of mullite porcelain, but it is difficult to further increase the amount of mullite beyond that presently achieved, when raw materials for the china and the conditions for firing thereof are considerably limited.

A problem to be solved at present is to develop a method for preparing cheap china for ceramic whiteware exhibiting high strength and high thermal shock resistance. To this end, it is necessary to devise a cost-saving method for increasing the content of mullite in the china or for substituting alumina (corundum) for quartz present in the china. Then, the inventors of this invention have devised the following two methods.

One method for increasing the mullite content is to use a natural ore material such as aluminous shale, bauxite, andalusite, kyanite or sillimanite which forms mullite through firing or a material obtained by calcining the natural ore material to form mullite, as an ingredient for the china-forming raw material. This method for increasing the mullite content through the use of the foregoing natural ores permits the production of cheap china for ceramic whiteware exhibiting improved thermal shock resistance.

The other method for replacing quartz present in the china with alumina (corundum) is to use, in the raw material for preparing the china for ceramic whiteware, a natural ore material which forms corundum through firing such as aluminous shale or bauxite, or a material obtained by firing the natural ore material to form corundum. The method for replacing quartz present in the china with alumina (corundum) while making use of the foregoing natural ores permits the production of a desired china at a cost lower than that required for the production of the high strength china for ceramic whiteware by the conventional method in which purified alumina is used.

Moreover, the simultaneous execution of the foregoing two methods permits the production of more cheaper, high strength china for ceramic whiteware exhibiting more excellent thermal shock resistance as compared with the china produced by the conventional techniques in which alumina is substituted for quartz.

The foregoing two methods can likewise be simultaneously carried out if using a natural ore material such as aluminous shale or bauxite which forms both corundum and mullite through firing or a material obtained by calcining the natural ore material to form both corundum and mullite.

The present invention will hereinafter be described in more detail.

Raw materials used for the production of the china for ceramic whiteware prepared by the method of the present invention are as follows:

1) at least one member selected from the group consisting of natural ore materials which form corundum through firing such as aluminous shale, bauxite, white bauxite and diaspore; and raw materials obtained by calcining the foregoing natural ore materials to form corundum, as a raw material for forming corundum in the china (hereunder referred to as corundum source material);

2) at least one member selected from the group consisting of natural ore materials which form mullite through firing such as andalusite, kyanite, sillimanite, aluminous shale, bauxite and white bauxite; and raw materials obtained by firing the foregoing natural ore materials to form mullite, as a raw material for increasing the content of mullite in the china (hereunder referred to as mullite source material);

3) clayey materials such as ball clay, Gairome clay, china clay or kaolin including clay minerals, for instance, kaolinite and dickite as a plastic material;

4) at least one flux such as feldspar, nepheline, dolomite, calcite or magnesite, which include alkali or alkaline earth metal oxides;

5) raw materials including quartz such as pottery stone and silica sand; and 6) at least one member selected from the group consisting of natural ore materials which form both corundum and mullite through firing such as aluminous shale, bauxite, white bauxite and diaspore and raw materials obtained by calcining the foregoing natural ore materials to form corundum and mullite, as a raw material for forming corundum and for increasing the content of mullite in the china (hereunder referred to as corundum-mullite source material).

The foregoing raw materials 1) to 4) and optionally the raw material 5) are used as principal components. Alternatively, it is also possible to use the raw material 6) instead of the raw materials 1) and 2).

Almost all of the natural ore materials used as the corundum, mullite and corundum-mullite source materials undergo a volume change due to dehydration and/or crystalline conversion encountered when forming corundum and/or mullite through firing.

Bauxite is an ore mainly comprising gibbsite, and gibbsite loses crystal water and is converted into corundum through firing and this is accompanied by a substantial volume change.

For this reason, if bauxite is used as a raw material, the resulting china-forming raw material is not easily sintered and this often results in the formation of china having low strength. Therefore, if bauxite is used as a raw material, it is preferably calcined in advance.

On the other hand, aluminous shale is an ore mainly comprising diaspore and diaspore loses water and is converted into corundum through firing like bauxite.

Gibbsite is $\gamma$-$Al_2O_3$ trihydrate, while diaspore is $\alpha$-$Al_2O_3$ monohydrate. Therefore, the amount of water removed is smaller when aluminous shale is fired. For this reason, aluminous shale per se may be used as a raw material and can provide china superior to that obtained using bauxite as such. However, the firing of aluminous shale is accompanied by a slight volume change and accordingly, it is also preferred to calcine aluminous shale prior to use as a raw material.

If bauxite and aluminous shale are calcined in advance, both of them undergo dehydration at a temperature ranging from 600 to 800° C. and cause the maximum volume reduction at that =temperature range. Therefore, they are preferably calcined at a temperature of not less than 800° C., more preferably at a temperature of 1000~1500° C.

The natural ore raw materials which form mullite through firing such as andalusite, kyanite and sillimanite form mullite crystals at a temperature ranging from 1100 to 1500° C., although the temperature slightly varies depending on the kinds of the ore materials. At this stage, they undergo a slight volume change. For this reason, it is preferred to calcine these raw materials in advance for the same reason already discussed above.

The natural ore materials which form corundum through firing such as aluminous shale and bauxite also form mullite depending on the compositions thereof. This is because, these raw materials include glassy substances or ores mainly comprising $SiO_2$ and $Al_2O_3$ in addition to principal components such as diaspore and gibbsite. For this reason, mullite is formed from these components when firing them. The use of such natural ore materials permits the elimination of the use of a mullite source material.

Moreover, purified alumina and/or purified mullite may be used as a part of the china-forming raw material for the purpose of stabilizing physical properties of the china and of adjusting the composition thereof.

The foregoing raw materials are used for forming alumina (corundum) particles and/or mullite particles in the china and, therefore, the particle size of the raw materials plays an important role. The strength of the china is greatly affected by the size of these particles present in the china. Therefore, if they can uniformly be dispersed in a glass phase, the smaller the particle size, the higher the strength of the resulting china. However, if it is too small, the aggregate particles are insufficiently dispersed and the strength thereof is conversely reduced. For this reason, the average particle size of these raw materials preferably ranges from 1 to 50 $\mu$m and more preferably 1 to 20 $\mu$m in order to further improve the strength of the china.

Then the composition and component ratio of each china-forming raw material are preferably selected or established in such a manner that the china has the following texture and composition:

① The china for ceramic whiteware prepared by the method of the present invention comprises, based on the total weight of the china, 15 to 70% of crystalline particles and 30 to 85% of a glass matrix mainly comprising $SiO_2$.

② The crystalline particles comprise, based on the total weight of the china, 10 to 65% of corundum and 5 to 60% of mullite and may optionally comprise other crystal particles of, for instance, quartz, cristobalite, andalusite, kyanite, zircon, zirconia and titania.

The china has been designed so as to have the foregoing texture and composition, for the following reasons. The china preferably comprises corundum in an amount of not less than 10% to improve the strength thereof. Moreover, the china preferably comprises mullite in an amount of not less than 5% which is higher than that observed in the high strength china for ceramic whiteware prepared by the conventional technique in which alumina is substituted for quartz, for the improvement of the thermal shock resistance and not less than 10% for achieving the thermal shock resistance comparable to that of the quartz/feldspar/clay three component china for ceramic whiteware. This is because, if the amount of the crystalline particles is too high, in particular, if it exceeds 70%, the sinterability of the raw material is extremely impaired and the firing temperature correspondingly is beyond the practical range.

In respect of the choice of the raw materials to be used, in particular, the choice of the natural ore raw materials serving as corundum and/or mullite source materials, preferred are those capable of forming a large amount of corundum and/or mullite through firing. If the amounts of corundum and/or mullite formed are too small, it is difficult to obtain china for ceramic whiteware having the foregoing texture and composition.

If aluminous shale is used as a corundum source material, the content of $Al_2O_3$ is preferably not less than 50% for the foregoing reasons. If the content of $Al_2O_3$ is less than 50% (weight basis), the amounts of raw materials serving as plastic material for molding or flux to be used are limited and the resulting china-forming raw material exhibits poor moldability or sinterability.

Moreover, if aluminous shale is used as a corundum-mullite source material, it preferably has an $Al_2O_3$ content of not less than 50% by weight and an $SiO_2$ content of not less than 5% by weight. The presence of $SiO_2$ permits the formation of mullite through firing. If the amount of $SiO_2$ is too small, a sufficient amount of mullite is not formed and aluminous shale does not function as the mullite source material.

The china for ceramic whiteware can be obtained by mixing the foregoing raw materials in the rate defined above, optionally pulverizing the mixture to a desired particle size, molding and then firing the mixture.

The raw materials may be mixed and pulverized at the same time or a part or the whole of these materials may be separately pulverized and then mixed together. In this respect, the overall average particle size of the china-forming raw material preferably ranges from 1 to 20 $\mu$m. This is because if the particle size of the raw material is too large, the sinterability of the raw material is impaired and it cannot be sintered within the practical firing temperature range. On the other hand, if the particle size thereof is too small, it is difficult to mold the raw material. The raw material may be pulverized by a dry or wet pulverization method or any other method.

The raw material whose particle size is controlled can be treated depending on the molding method, for example slurrying to add water, or powdering by spray dry process and then formed into a desired shape by a variety of molding methods such as pressing, casting, injection molding, slip casting in which a gypsum mold or a resin mold having water absorption properties is used.

The china-forming raw material is preferably fired at a firing temperature of not less than 800° C. under atmospheric condition, or oxidizing or reducing atmosphere to obtain a sufficiently dense china. The firing method may be a batchwise or continuous method. Any firing furnace such as electric furnace or a gas furnace may be used for the firing.

COMPARATIVE EXAMPLE 1

There were prepared, by way of comparative examples, china for ceramic whiteware comprising pottery stone, feldspar and clay as raw materials; a high strength china for ceramic whiteware according to the conventional technique; and china for ceramic whiteware to which silica sand was added to improve the thermal shock resistance (hereunder referred to as comparative china (or C.C.) 1, 2 and 3, respectively) and these comparative china were inspected for physical properties. The raw materials, the composition after blending and the examined physical properties of each china are listed in the following Table 1.

In the comparative china 2 and 3, the alumina (corundum) source material used was AM-21 purified by the Bayer's method and available from Sumitomo Chemical Co., Ltd. The alumina has an $Al_2O_3$ purity of 99.7% and an average particle size of about 4 $\mu$m.

In the comparative china 3, Masuda silica stone pulverized to an average particle size of about 10 $\mu$m was used. The crystal thereof is quartz and it has an $SiO_2$ purity of 99.5%.

Each china was prepared by the following method. To the china-forming raw materials other than silica sand, there were added water in a volume identical to that of the whole raw materials and an appropriate amount of water-glass, followed by pulverization in a ball mill, addition of silica sand after the completion of the pulverization and then mixing in a ball mill for about 30 minutes to give a starting slurry. In respect of the pulverization, the comparative china 1 was pulverized to an average particle size of about 8 $\mu$m, while the comparative china 2 and 3 were pulverized to an average particle size of about 5 $\mu$m.

Then each starting slurry was poured into a gypsum mold and then demolded to give a green test piece having a diameter of 15 mm and a length of 150 mm.

Then each green test piece was dried at 40° C. whole day and night, followed by firing according to the following heating schedule: heating up to 1000° C. over 4 hours and then up to 1200° C. over 2 hours, maintaining at 1200° C. for one hour in an electric furnace and then allowing to natural cool.

Physical properties were determined as follows:

Bending strength was determined according to the three-point bending test using Autograph available from Shimadzu Corporation under the following conditions: a span of 100 mm and a cross head speed of 2.5 mm/mim.

Thermal shock resistance was determined by the following method.

After maintaining each test piece at a predetermined temperature for about one hour in a heating device, the test piece was immediately immersed in water and allowed to stand for several minutes. Then the test piece was immersed in an ink for ink-check for the evaluation of cracks thus formed by the thermal shock. The thermal shock resistance of each test piece was expressed in terms of the difference between the crack-forming temperature and the temperature of the water used for quenching.

The data listed in Table 1 indicate that the use of alumina as in the comparative china 2 permits an increase in the strength of the material on the order of not less than 2 times that observed for the china for ceramic whiteware comprising pottery stone, feldspar and clay as raw materials, but the thermal shock resistance thereof is impaired. On the other hand, the use of silica sand as in the comparative china 3 permits the improvement in the thermal shock resistance of the china, but the resulting china is inferior in the thermal shock resistance to the comparative china 1 and is inferior in the strength to the comparative china 2.

TABLE 1

Comparative China and Physical Properties

| Raw Materials used | C.C.1 | C.C.2 | C.C.3 |
|---|---|---|---|
| Blend Composition (%) | | | |
| Pottery Stone | 60 | — | — |
| Alumina | — | 45 | 25 |
| Silica Sand | — | — | 20 |
| Clay | 25 | 40 | 40 |
| Feldspar | 15 | 15 | 15 |
| China Mineral Composition (wt %) | | | |
| Corundum | — | 55.3 | 27.4 |
| Quartz | 11.3 | — | 10.7 |
| Mullite | 13 | 5.6 | 5.4 |
| Physical Properties | | | |
| Bending Strength (MPa) | 80 | 170 | 140 |
| Thermal Shock Resistance (° C.) | 140 | 110 | 130 |

EXAMPLE 1

China was prepared by the method of the present invention. The raw materials used, the composition after blending and physical properties are summarized in the following Table 2. Alumina, silica sand, clay and feldspar used as the raw materials were the same as those used in Comparative Example 1. The purified mullite used was Electrofused Mullite RM-80 available from Showa Denko, K.K. having a mullite purity of not less than 99%.

The chemical composition and mineral composition of the natural ore raw material used as a corundum or mullite source are listed in Table 3.

These natural ore raw materials and the purified mullite were pulverized to an average particle size of about 5 $\mu$m (unless otherwise specified in Table 2) using a ball mill. Calcined raw material was calcined at 1500° C. prior to the pulverization.

The results of the china 1—1 and 1-2 indicate that the addition of mullite permits the improvement in the thermal shock resistance of the resulting china. Although silica sand also shows the same effect, but the effect of mullite differs from that of silica sand in that the resulting china does not exhibit any reduction of the strength through addition of mullite. Thus, the addition of mullite permits the improvement of the thermal shock resistance without impairing the strength of the resulting china.

In the china 2-1 to 2-4, a raw material obtained by calcining aluminous shale was used as the corundum source material. The added amount thereof and physical properties of the china are listed in Table 2. The results of these china indicate that the strength of the china is improved by increasing the added amount of the calcined aluminous shale, while the sinterability thereof is impaired. The strength of the china observed when aluminous shale is used is slightly inferior to that observed for the china in which the purified alumina raw material is used. This is because the corundum content of the calcined aluminous shale is low and therefore, the higher the corundum content of calcined aluminous shale used, the higher the strength of the resulting china.

On the other hand, the thermal shock resistance of the china in which aluminous shale is used (china 2—2) is greater than that of the china (comparative china 2) wherein the purified alumina is used. This is because the calcined aluminous shale comprises mullite. It is thus believed that the use of calcined aluminous shale results in an increase in the mullite content of the china and accordingly, the thermal shock resistance thereof is improved.

As has been discussed above, china for ceramic whiteware having high strength and excellent thermal shock resistance can be prepared through the use of corundum and mullite-containing natural ore raw materials.

The china 3 is one obtained using uncalcined aluminous shale and it is slightly inferior in both strength and thermal shock resistance to the china wherein calcined aluminous shale is used. However, the china has a merit in cost since the calcining treatment of aluminous shale can be omitted and may be used in applications which do not require extremely high strength and thermal shock resistance.

The china 4 comprises silica sand for the purpose of further improvement of the thermal shock resistance thereof and accordingly, exhibits high strength and excellent thermal shock resistance approximately identical to that observed for the conventional china (comparative china 1) mainly comprising pottery stone, feldspar and clay.

The china 5-1 to 5-4 have a composition identical to that of the china 4, but differ in the particle size of calcined aluminous shale from the latter. If the particle size of calcined aluminous shale becomes large, the strength of the china is not changed, but if it becomes too small, the strength is lowered. However, the larger the particle size of calcined aluminous shale, the longer the time required for pulverizing.

In the china 6 and 7, bauxite and calcined bauxite are used as the corundum source material. When calcined bauxite is used, china exhibiting high strength can be obtained, but when uncalcined bauxite is used, the resulting china is not sintered and the strength thereof is almost identical to that observed for the conventional china for ceramic whiteware.

The china 8 and 9 have compositions identical to that of the china 1—1 except that andalusite and calcined andalusite are used as the mullite source materials. The resulting china were slightly inferior in the strength to the china 1—1, but exhibited excellent thermal shock resistance.

EXAMPLE 2

Figure 1A:
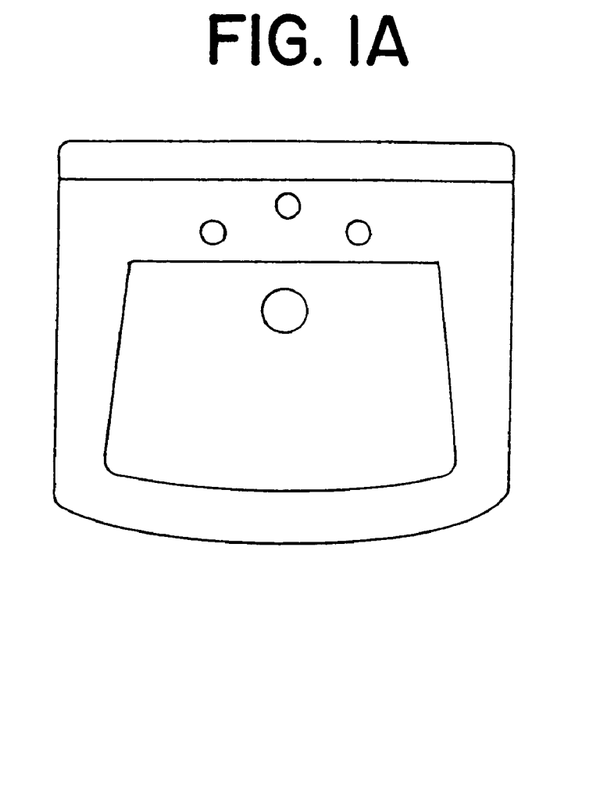
Figure 1B:
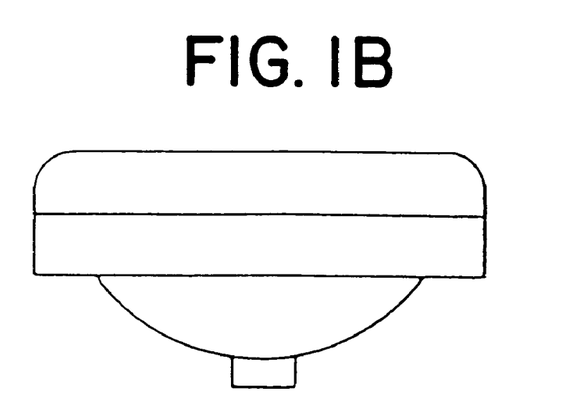
Figure 2A:
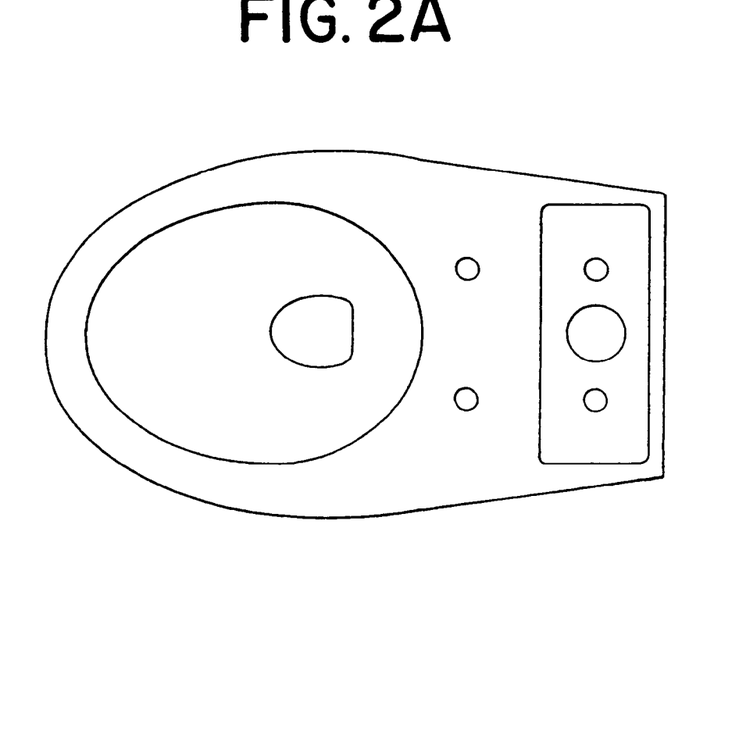
Figure 2B:
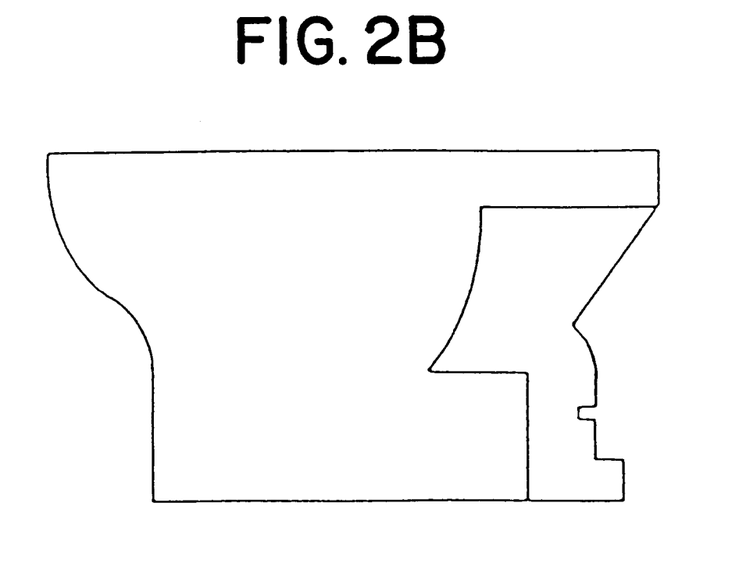

There were prepared, according to the method of the present invention, two kinds of sanitary-wares, i.e., a wash bowl as shown in FIG. 1 and a water closet as shown in FIG. 2. Two kinds of china (comparative china 2 and the china 4 of Example 1) were used for the preparation of the sanitary-wares to thus confirm the effect of the present invention. The preparation of these sanitary-wares was carried out by molding while using gypsum molds for forming respective sanitary-wares instead of the gypsum molds for preparing the green test pieces used in Comparative Example 1 and Example 2, then drying and spraying a glaze, thereafter firing the molded article in a heavy oil combustion type continuous tunnel kiln, in which a cycle comprising heating from room temperature up to a maximum temperature of 1200° C. and cooling down to room temperature required 24 hours was used, in place of the electric furnace.

The results thus obtained are summarized in the following Table 4. In Table 4, the term "kiln crack" phenomenon means that an article causes cracking by the heat shock during cooling step of the firing process and relatively small-sized articles such as wash bowls do not cause "kiln crack" phenomenon even when the comparative china 2 is used. However, large-sized articles such as water closet cause the "kiln crack" phenomenon when using the comparative china 2 having poor thermal shock resistance.

Moreover, it is defined in JIS (A5207) that the sanitary-ware must pass a desired quenching test and the articles prepared from the comparative china 2 cannot pass such a quenching test.

This quenching test comprises the steps of maintaining a fragment of a ceramic whiteware having a size of about 100 cm² and a thickness of not more than 15 mm in a heated furnace for one hour, then quenching in water and immersing it in a red ink to inspect it for the presence of cracks in the china and the glaze layer. The fragment should not cause any crack at a temperature difference between the heating temperature and the temperature of the quenching water of not more than 110° C.

As has been discussed above in detail, the high strength china for ceramic whitewares prepared by the conventional techniques in which alumina is substituted for the quartz in the quartz/feldspar/clay three component china for ceramic whitewares exhibits poor thermal shock resistance. Contrary to this, the present invention permits, for the first time, the preparation of a high strength china for ceramic whiteware having excellent thermal shock resistance at a low cost. The china of the present invention can be applied to sanitary-wares.

TABLE 2

China Prepared by the Method of the Present Invention and Physical Properties Thereof

| Raw Materials Used | 1-1 | 1-2 | 2-1 | 2-2 | 2-3 | 2-4 | 3 | 4 |
|---|---|---|---|---|---|---|---|---|
| Blend Composition (wt %) | | | | | | | | |
| Aluminous Shale | — | — | — | — | — | — | 40 | — |
| Calcined Aluminous Shale | — | — | 30 | 40 | 45 | 50 | — | 30 |
| Bauxite | — | — | — | — | — | — | — | — |
| Calcined Bauxite | — | — | — | — | — | — | — | — |
| Alumina | 25 | 25 | — | — | — | — | — | — |
| Andalusite | — | — | — | — | — | — | — | — |
| Calcined Andalusite | — | — | — | — | — | — | — | — |
| Mullite | 20 | 10 | — | — | — | — | — | — |
| Silica Sand | — | 10 | — | — | — | — | — | 20 |
| Clay | 40 | 40 | 52 | 45 | 40 | 37 | 45 | 40 |
| Feldspar | 15 | 15 | 18 | 15 | 15 | 13 | 15 | 10 |
| Firing Temp. (° C.) | 1200 | 1200 | 1200 | 1250 | 1250 | 1300 | 1250 | 1200 |
| Mineral Composition (wt %) | | | | | | | | |
| Corundum | 27.1 | 27.2 | 22.1 | 29.2 | 32.7 | 36.1 | 27.8 | 21.9 |
| Quartz | — | 6.9 | — | — | — | — | — | 11.3 |
| Mullite | 22.8 | 13.6 | 7.9 | 10.3 | 12.4 | 14.1 | 11.4 | 12.2 |
| Andalusite | — | — | — | — | — | — | — | — |
| Physical Properties | | | | | | | | |
| Bending Strength (MPa) | 155 | 151 | 145 | 158 | 159 | 168 | 152 | 150 |
| Thermal Shock Resistance (° C.) | 130 | 140 | — | 130 | — | — | 130 | 140 |

| Raw Materials Used | 5-1 | 5-2 | 5-3 | 5-4 | 5-5 | 6 | 7 | 8 | 9 |
|---|---|---|---|---|---|---|---|---|---|
| Blend Composition (wt %) | | | | | | | | | |
| Aluminous Shale | — | — | — | — | — | — | — | — | — |
| Calcined Aluminous Shale | 30 (1 μm) | 30 (3 μm) | 30 (7 μm) | 30 (20 μm) | 30 (50 μm) | — | — | — | — |
| Bauxite | — | — | — | — | 40 | — | — | — | — |
| Calcined Bauxite | — | — | — | — | — | — | 40 | — | — |
| Alumina | — | — | — | — | — | — | — | 25 | 25 |
| Andalusite | — | — | — | — | — | — | — | 20 | — |
| Calcined Andalusite | — | — | — | — | — | — | — | — | 20 |
| Mullite | — | — | — | — | — | — | — | — | — |
| Silica Sand | 20 | 20 | 20 | 20 | 20 | — | — | — | — |
| Clay | 40 | 40 | 40 | 40 | 40 | 45 | 45 | 40 | 40 |
| Feldspar | 10 | 10 | 10 | 10 | 10 | 15 | 15 | 15 | 15 |
| Firing Temp. (° C.) | 1200 | 1200 | 1200 | 1250 | 1200 | 1300 | 1200 | 1250 | 1250 |
| Mineral Composition (wt %) | | | | | | | | | |
| Corundum | — | — | — | — | — | 22.8 | 29.6 | 27.3 | 27.2 |
| Quartz | — | — | — | — | — | — | — | — | 5.4 |

TABLE 2-continued

China Prepared by the Method of the Present Invention and Physical Properties Thereof

| | | | | | | | | | |
|---|---|---|---|---|---|---|---|---|---|
| Mullite | — | — | — | — | — | 12.3 | 11.2 | 7.8 | 17.4 |
| Andalusite | — | — | — | — | — | — | — | 16.3 | — |
| Physical Properties | | | | | | | | | |
| Bending Strength (MPa) | 134 | 157 | 146 | 148 | 142 | 74 | 152 | 148 | 154 |
| Thermal Shock Resistance (° C.) | — | — | — | — | — | — | — | 130 | 130 |

TABLE 3

Composition of Natural Ore Materials Used in the Present Invention

| Raw Material | Aluminous Shale | Calcined Aluminous Shale | Bauxite | Calcined Bauxite | Andalusite | Calcined Andalusite |
|---|---|---|---|---|---|---|
| Chemical Comp. (wt %) | | | | | | |
| $Al_2O_3$ | 72.7 | 82 | 56.5 | 83 | 60 | 60.3 |
| $SiO_2$ | 6.7 | 10 | 11.25 | 12 | 38.1 | 38.2 |
| $Fe_2O_3$ | 1.2 | 1.5 | 3.5 | 2.6 | 0.85 | 0.85 |
| $TiO_2$ | 3.7 | 4.3 | 0.60 | 2.5 | 0.15 | 0.15 |
| CaO | 0.55 | 0.28 | — | — | 0.05 | 0.06 |
| MgO | 0.29 | 0.11 | — | — | 0.20 | 0.21 |
| $Na_2O$ | 0.07 | — | — | — | 0.10 | 0.10 |
| $K_2O$ | 0.37 | 0.17 | — | — | 0.12 | 0.13 |
| Ig. loss | 14.0 | 0.14 | 28.2 | — | 0.43 | — |
| Mineral Composition (wt %) | | | | | | |
| Corundum | X | 72 | X | ○ | X | X |
| Diaspore | ○ | X | X | X | X | X |
| Gibbsite | X | X | ○ | X | X | X |
| Quartz | X | X | X | X | X | Δ |
| Andalusite | X | X | X | X | ○ | X |
| Mullite | X | 14.3 | X | Δ | X | ○ |
| Anatase | Δ | X | Δ | X | X | X |
| Rutile | Δ | X | X | X | X | X |

Numerical values mean the quantitatively determined ones.

The symbols ○ and Δ represent that quantitative values were not determined, ○ means principal components and Δ means minor components. The symbol X means that each corresponding component was not detected.

TABLE 4

Results of Preparation of Sanitary-wares

| | Wash Bowl | | Water closet | |
|---|---|---|---|---|
| | C.C.2 | China 4 | C.C.2 | China 4 |
| Kiln Crack | ○ | ○ | X | ○ |
| Quenching Test | X | ○ | X | ○ |

○: No Problem;
X: Not Acceptable
C.C.: Comparative China

What is claimed is:

1. A method for preparing high strength and high thermal shock-resistant china for ceramic whiteware comprising the steps of:
    molding a china-forming raw material mainly comprising
        an aluminous shale which comprises 50% weight or more of $Al_2O_3$ and $SiO_2$;
        a clayey material; and
        a flux, and then
    firing the molded china-forming raw material.

2. A method for preparing high strength and high thermal shock-resistant china for ceramic whiteware comprising the steps of:
    molding a china-forming raw material mainly comprising
        a material obtained by calcining an aluminous shale which comprises 50% weight or more of $Al_2O_3$ and $SiO_2$ to form corundum and mullite;
        a clayey material; and
        a flux, and then
    firing the molded china-forming raw material.

3. The method of claim 1 or 2, wherein the china-forming raw material includes pottery stone comprising quartz.

4. The method for claim 1 or 2, wherein the china-forming raw material includes silica sand comprising quartz.

5. The method of claim 1 or 2, wherein the flux is at least one member selected from the group consisting of feldspar, nepheline and dolomite.

6. The method of claim 1 or 2, wherein the overall average particle size of the china-forming raw material is controlled between the range of 1 to 20 μm.

7. The method of claim 1 or 2, wherein the china for ceramic whiteware is china for sanitary-ware.

8. The method of claim 1 or 2, wherein the china for ceramic whiteware comprises 15 to 70% of crystalline particles and 30 to 85% of a glass matrix mainly comprising $SiO_2$, on the basis of the total weight of the china, said crystalline particles comprising 10 to 65% of corundum.

9. The method of claim 1, wherein the aluminous shale is not calcined before the firing step.

* * * * *